US010776196B2

(12) United States Patent
Ohana et al.

(10) Patent No.: US 10,776,196 B2
(45) Date of Patent: Sep. 15, 2020

(54) SYSTEMS AND METHODS FOR ANOMALY DETECTION IN A DISTRIBUTED COMPUTING SYSTEM

(71) Applicant: International Business Machines Corporation, Armonk, NY (US)

(72) Inventors: David Ohana, Haifa (IL); Bruno Wassermann, Ra'anana (IL); Nir Rozenbaum, Kityat Bialik (IL)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/115,580

(22) Filed: Aug. 29, 2018

(65) Prior Publication Data

US 2020/0073740 A1    Mar. 5, 2020

(51) Int. Cl.
*G06F 11/07*    (2006.01)

(52) U.S. Cl.
CPC ........ *G06F 11/079* (2013.01); *G06F 11/0709* (2013.01); *G06F 11/0751* (2013.01); *G06F 11/0772* (2013.01)

(58) Field of Classification Search
CPC .............. G06F 11/076; G06F 11/0721; G06F 11/3447; G06F 11/3452; G06F 11/079; H04L 43/08; H04L 43/16
See application file for complete search history.

(56) References Cited

U.S. PATENT DOCUMENTS

| 7,526,670 | B2 * | 4/2009 | Lloyd ................. | G06F 11/3447 714/4.1 |
| 8,495,429 | B2 * | 7/2013 | Fu ....................... | G06F 11/3608 714/25 |
| 9,141,914 | B2 * | 9/2015 | Viswanathan ......... | G06N 20/00 |
| 9,292,408 | B2 | 3/2016 | Bernstein et al. | |
| 9,652,354 | B2 | 5/2017 | Filimonov et al. | |
| 9,772,896 | B2 | 9/2017 | Caffrey | |

(Continued)

OTHER PUBLICATIONS

Chandola et al., "Anomaly Detection: A Survey", ACM Computing Surveys (CSUR), Jul. 2009, vol. 41, Issue 3.

(Continued)

*Primary Examiner* — Matthew M Kim
*Assistant Examiner* — Kurosu Risa Altaf
(74) *Attorney, Agent, or Firm* — Roy S. Melzer

(57) ABSTRACT

There is provided a system for identifying a system level anomalous, comprising code for receiving data-points indicative of a time-based dynamic state of processing nodes of a distributed system, each associated with a timestamp, a metric, and a metric value, clustering the data-points into clusters, comprising a sub-set of the data-points having a same metric and a timestamp within a same metric anomaly time interval, computing metric anomaly scores for each respective cluster denoting likelihood of an anomaly being present, analyzing metric anomaly scores of each system level anomalous time interval including at least two of the metric anomaly time intervals, computing a single anomalous event score for each respective system level anomalous time interval according to the analysis, and generating an alert indicative of the system level anomalous event for a certain system level anomalous time interval when the single anomalous event score is according to an anomaly requirement.

17 Claims, 3 Drawing Sheets

(56) References Cited

U.S. PATENT DOCUMENTS

| | | | |
|---|---|---|---|
| 10,015,184 B1* | 7/2018 | Bell | H04L 63/1425 |
| 2014/0096249 A1 | 4/2014 | Dupont et al. | |
| 2015/0269050 A1* | 9/2015 | Filimonov | G06N 7/005 |
| | | | 702/183 |
| 2016/0147583 A1 | 5/2016 | Ben Simhon et al. | |
| 2019/0384662 A1* | 12/2019 | Bonnell | G06F 16/2228 |

OTHER PUBLICATIONS

Kliger et al., "A Coding Approach to Event Correlation", Integrated Network Management IV, 1995, pp. 266-277.

Jakobson et al., "Alarm Correlation", IEEE Network, 1993, pp. 52-59, vol. 7, Issue 6.

Idé et al., "Computing Correlation Anomaly Scores Using Stochastic Nearest Neighbors", Seventh IEEE International Conference on Data Mining (ICDM 2007), 2007, pp. 523-528.

Cheng et al., "Detection and Characterization of Anomalies in Multivariate Time Series", SIAM International Conference on Data Mining, 2009, pp. 413-424.

Cheng et al., "A Robust Graph-Based Algorithm for Detection and Characterization of Anomalies in Noisy Multivariate Time Series", IEEE International Conference on Data Mining Workshops, 2008, pp. 349-358.

Vaarandi et al., "Event log analysis with the LogCluster tool", MILCOM 2016—2016 IEEE Military Communications Conference, 2016.

Hamooni et al., "LogMine: Fast Pattern Recognition for Log Analytics", 25th ACM International on Conference on Information and Knowledge Management, 2016, pp. 1573-1582.

Goldstein et al., "A Comparative Evaluation of Unsupervised Anomaly Detection Algorithms for Multivariate Data", 2016, PLoS ONE 11(4).

Song et al., "CAML: Machine Learning-based Predictable, System-Level Anomaly Detection", Workshop on Security and Dependability of Critical Embedded Real-Time Systems, 2016.

Nayyar et al., "Anomaly Detection for Univariate Time-Series Data", 2016, Virginia Tech CSx824/ECEx424 final project report.

Fu et al., "Execution Anomaly Detection in Distributed Systems through Unstructured Log Analysis", Ninth IEEE International Conference on Data Mining, 2009, pp. 149-158.

Ren et al., "Anomaly detection in time series based on interval sets", IEEJ Transactions on Electrical and Electronic Engineering, 2018, vol. 13, Issue 5.

* cited by examiner ive of the system level anomalous event for a certain system level anomalous time interval when the single anomalous event score is according to an anomaly requirement.

SYSTEMS AND METHODS FOR ANOMALY DETECTION IN A DISTRIBUTED COMPUTING SYSTEM

BACKGROUND

The present invention, in some embodiments thereof, relates to anomaly detection and, more specifically, but not exclusively, to systems and methods for anomaly detection in a distributed computing system.

In the field of data mining, anomaly detection refers to data that does not conform to an expected pattern or to other items in a dataset. The anomalous data may be indicative of a problem. Anomaly detection is used in computing systems, for example, for detecting malicious activity, and/or errors in operation of the system.

SUMMARY

According to a first aspect, a system for identifying a system level anomalous event in a distributed computing system comprising a plurality of processing nodes, comprises: a non-transitory memory having stored thereon a code for execution by at least one hardware processor, the code comprising code for: receiving a plurality of data-points indicative of a time-based dynamic state of the plurality of processing nodes of the distributed computing system, wherein each of the plurality of data-points is associated with a timestamp, a metric of a plurality of metrics, and a metric value, clustering the plurality of data-points into a plurality of clusters, wherein each cluster comprises a respective sub-set of the plurality of data-points having a same metric of the plurality of metrics and a timestamp within a same metric anomaly time interval of a plurality of metric anomaly time intervals, computing a plurality of metric anomaly scores, wherein each respective metric anomaly score is computed for each respective cluster of the plurality of clusters, and denotes likelihood of an anomaly being present within the respective cluster, analyzing the plurality of metric anomaly scores of each system level anomalous time interval of a plurality of system level anomalous time intervals, wherein each system level anomalous time interval includes at least two of the plurality of metric anomaly time intervals, computing a single anomalous event score for each respective system level anomalous time interval according to the analysis of the plurality of metric anomaly scores for the respective system level anomalous time interval, and generating an alert indicative of the system level anomalous event for a certain system level anomalous time interval when the single anomalous event score is according to an anomaly requirement.

According to a second aspect, a method of identifying a system level anomalous event in a distributed computing system comprising a plurality of processing nodes, comprises: receiving a plurality of data-points indicative of a time-based dynamic state of the plurality of processing nodes of the distributed computing system, wherein each of the plurality of data-points is associated with a timestamp, a metric of a plurality of metrics, and a metric value, clustering the plurality of data-points into a plurality of clusters, wherein each cluster comprises a respective sub-set of the plurality of data-points having a same metric of the plurality of metrics and a timestamp within a same metric anomaly time interval of a plurality of metric anomaly time intervals, computing a plurality of metric anomaly scores, wherein each respective metric anomaly score is computed for each respective cluster of the plurality of clusters, and denotes likelihood of an anomaly being present within the respective cluster, analyzing the plurality of metric anomaly scores of each system level anomalous time interval of a plurality of system level anomalous time intervals, wherein each system level anomalous time interval includes at least two of the plurality of metric anomaly time intervals, computing a single anomalous event score for each respective system level anomalous time interval according to the analysis of the plurality of metric anomaly scores for the respective system level anomalous time interval, and generating an alert indicative of the system level anomalous event for a certain system level anomalous time interval when the single anomalous event score is according to an anomaly requirement.

According to a third aspect, a computer program product for identifying a system level anomalous event in a distributed computing system comprising a plurality of processing nodes, comprises: a non-transitory memory having stored thereon a code for execution by at least one hardware processor, the code comprising instructions for: receiving a plurality of data-points indicative of a time-based dynamic state of the plurality of processing nodes of the distributed computing system, wherein each of the plurality of data-points is associated with a timestamp, a metric of a plurality of metrics, and a metric value, clustering the plurality of data-points into a plurality of clusters, wherein each cluster comprises a respective sub-set of the plurality of data-points having a same metric of the plurality of metrics and a timestamp within a same metric anomaly time interval of a plurality of metric anomaly time intervals, computing a plurality of metric anomaly scores, wherein each respective metric anomaly score is computed for each respective cluster of the plurality of clusters, and denotes likelihood of an anomaly being present within the respective cluster, analyzing the plurality of metric anomaly scores of each system level anomalous time interval of a plurality of system level anomalous time intervals, wherein each system level anomalous time interval includes at least two of the plurality of metric anomaly time intervals, computing a single anomalous event score for each respective system level anomalous time interval according to the analysis of the plurality of metric anomaly scores for the respective system level anomalous time interval, and generating an alert indicative of the system level anomalous event for a certain system level anomalous time interval when the single anomalous event score is according to an anomaly requirement.

At least some of the systems, methods, apparatus, and/or code instructions described herein address the technical problem of monitoring a distributed computing system of multiple computational nodes, for example, a computing cloud, a set of network connected processing nodes, and/or a multi-core processor. Monitoring such distributed computing system is a demanding task which requires a significant amount of human resources, often compared to finding a needle in a haystack. Each node of the distributed system potentially reports thousands or more of various time-based data-points in addition to massive amount of unstructured data. Anomalous events in these data sources might be related to system failures. Manual detection of significant anomalous events in such a system might be difficult due to the inability of a human to process enormous amounts of data. Failures might be missed or discovered too late, increasing MTTR (Mean-Time-To-Repair).

Setting alerts using static thresholds for a subset of the data-points may produce too many alerts, which might introduce an "alert fatigue", a state that occurs when one is exposed to many frequent alerts and consequently becomes desensitized to them. Desensitization may lead, for example, to longer response times, and/or to missing important alerts, which in turn might again increase MTTR. In addition, defining accurate static alerts thresholds and continuously tuning them is usually a time-consuming task, due to the dynamicity of the environment (e.g., trends in number of users, software changes, and the like). It is also hard to predict in advance (before the first related failure) which of the available data-points is worth defining a threshold, and what value should this threshold be configured to.

Previous other methods have been developed for univariate anomaly detection (UVAD). Such UVAD methods may be used for anomaly detection in a single metric time series without the need of defining static thresholds. However, when monitoring a typical system which consists of a large number (e.g., thousands or more) of unique metrics using such a UVAD method, an anomaly in a single metric time series might be a frequent event which occurs once every few minutes, causing alert fatigue.

Distributed systems, especially ones that include a large number of processing nodes and/or a large number of different types of metrics generated at high rates may be analyzed using multivariate anomaly detection methods that analyze multiple simultaneous time series.

At least some of the systems, methods, apparatus, and/or code instructions described herein address the technical problem of improving the accuracy of automatic detection of significant anomalous events in a distributed computing system, for example, reducing the false negatives and/or increasing the true positives.

At least some of the systems, methods, apparatus, and/or code instructions described herein provide an improvement to the field of monitoring performance of a distributed computing system. The improvement is based on computation of the single anomalous event score described herein, which is indicative of a system wide likelihood of an anomalous event taking place. The anomalous event is not necessarily isolated to one or more components of the distributed computing system, but may be significant enough to affect operation stability of the entire distributed computing system as a whole. For example, the single anomalous event score may capture anomalous behavior starting with a certain processing node, which due communication with other processing nodes, affects multiple other processing nodes. Each processing node may not necessarily exhibit significant anomalous behavior, however, taken together as a whole over the entire distributed system, the individual anomalous activities creates a synergistic anomalous event within the distributed processing system that may be significant in terms of operation stability of the distributed computing system. Such synergistic anomalous events occurring in the distributed computing system may not be detected by other approaches that independently monitor each processing node, especially when each node is only slightly affected and does not trigger an alert.

At least some of the systems, methods, apparatus, and/or code instructions described herein improve the technical field of automatic detection of system-level significant anomalies in a distributed computing system. At least some of the systems, methods, apparatus, and/or code instructions described herein improve the computational efficiency of a computing device that performs automatic detection of system-level significant anomalies in a distributed computing system in comparison to other approaches, for example, in terms of reduced utilization of computational resources (e.g., processors), reduced processing time, and/or reduced memory requirements. Exemplary improvements obtained by at least some of the systems, methods, apparatus, and/or code instructions described herein include one or more of the following:

Other approaches requires a prior knowledge of the architecture and/or dependencies between components of the monitored distributed system, which makes the initial setup very complex. In contrast, at least some of the systems, methods, apparatus, and/or code instructions described herein do not require such prior knowledge of the architecture and/or dependencies between components of the monitored distributed system, making the initial setup quick and/or easy.

Other approaches introduce a high and/or non-linear computation complexity, which might cause a situation where the required computing resources for anomaly detection of a single system data are impracticable. In contrast, at least some of the systems, methods, apparatus, and/or code instructions described herein scale with increasing number of metrics and/or provide for computational efficiency of the computing device that detects the anomalous events as described herein.

Other approaches requires a normal training set as a reference. Such normal training set is a long duration data set in which the monitored system behaves normally without any unusual incidents. Re-training by a new normal training set should be repeated periodically as the system evolves. In contrast, at least some of the systems, methods, apparatus, and/or code instructions described herein do not require designating a normal training set as a reference, do not require long duration dataset without unusual incidents, and do not require re-training.

Other approaches are not able to detect anomalous incidents in near-real-time (i.e., a short time from incident time to detection time). For example, anomaly detection processes may require batches of data taken hourly or daily. In contrast, at least some of the systems, methods, apparatus, and/or code instructions described herein provide for near-real-time detection of anomalous events.

Other approaches require that ranges (e.g., min-max) and/or distribution function of the data-points to be known in advance. In contrast, at least some of the systems, methods, apparatus, and/or code instructions described herein do not require prior knowledge of the ranges and/or the distribution function of the data-points.

Other approaches do not monitor unstructured data for anomalous events. In contrast, at least some of the systems, methods, apparatus, and/or code instructions described herein detect anomalous events according to unstructured data.

Other approaches suffer from inadequate accuracy, for example, a high number of false positives and/or low number of true positives. In contrast, at least some of the systems, methods, apparatus, and/or code instructions described herein provide high accuracy, for example, a low number of false positives and/or a high number of true positives.

In a further implementation form of the first, second, and third aspects, the system further comprises code instructions for and/or the method further comprises and/or the computer program product further comprises additional instructions for generating code instructions for controlling the distributed computing system for mitigating effects of the system level anomalous event on operation of the distributed computing system.

In a further implementation form of the first, second, and third aspects, the system further comprises code instructions for and/or the method further comprises and/or the computer program product further comprises additional instructions for code for identifying a pattern of the plurality of metric anomaly scores of a certain system level anomalous time interval, computing a similarity penalty score when the identified pattern is similar according to a similarity requirement to at least one historical pattern of a historical plurality of metric anomaly scores of at least one historical system level anomalous time interval, and computing an adjusted single anomalous event score by adjusting the single anomalous event score according to the similarity penalty score, wherein the alert is generated according to the adjusted single anomalous event score.

In a further implementation form of the first, second and third aspects, the analyzing comprising: identifying, within at least one system level anomalous time intervals, a start time indicative of likelihood of onset of the system level anomalous event, removing a sub-set of the plurality of metric anomaly scores determined as outliers according to the start time to compute a remaining set of the plurality of metric anomaly scores, wherein the single anomalous event score is computed according to the remaining set of the plurality of metric anomaly scores.

In a further implementation form of the first, second and third aspects, the start time is computed according to a timestamp associated with a largest number of a set of the plurality of metric anomaly scores having highest values within a certain system level anomalous time interval, and wherein the outliers are computed according to metric anomaly scores located a distance away from the start time determined according to a statistical distance requirement.

In a further implementation form of the first, second, and third aspects, the system further comprises code instructions for and/or the method further comprises and/or the computer program product further comprises additional instructions for adjusting the remaining set of the plurality of metric anomaly scores according to a time distance from the start time, wherein metric anomaly scores having a relatively longer time distance from the start time are reduced relatively greater than metric anomaly scores having a relatively shorter time distance from the start time.

In a further implementation form of the first, second, and third aspects, the single anomalous event score is computed by aggregating the plurality of metric anomaly scores.

In a further implementation form of the first, second and third aspects, the analysis comprises performing a statistical comparison between certain metric anomaly scores of a certain system level anomalous time interval and a plurality of historical metric anomaly scores of a plurality of historical system level anomalous time interval, wherein the single anomalous event score is indicative of a statistical distance computed according to the statistical comparison, wherein the anomaly requirement denotes a threshold of the statistical distance.

In a further implementation form of the first, second and third aspects, the plurality of data-points are streamed in real time.

In a further implementation form of the first, second and third aspects, the plurality of data-points comprise a plurality of unstructured log messages, and further comprising code, features, and/or instructions for converting the unstructured log messages into at least one of the plurality of data-points, wherein each of the converted at least one of the plurality of data-points stores: (i) a message count value computed according to a number of time a same respective message template is selected from a plurality of messages templates over a template time interval, wherein a message template is selected for each of the plurality of unstructured log messages, wherein the metric value is set according to the message count value, (ii) an identification code indicative of the same respective message template selection over the template time interval, wherein the metric is set according to the identification code.

In a further implementation form of the first, second and third aspects, the plurality of templates are computed according to corresponding clusters created from the plurality of unstructured log messages.

In a further implementation form of the first, second and third aspects, each of the converted at least one of the plurality of data-points further stores at least one of: (iii) an indication of a certain processing node of the plurality of processing nodes from which the respective unstructured log message originated from, and (iv) an aggregation of respective numeric values of the unstructured log messages corresponding to parameters of the selected message templates.

In a further implementation form of the first, second and third aspects, the respective metric anomaly score computed according to data-points of each metric of the plurality of metrics is computed according to a univariate time series anomaly detection method applied to a time series created from aggregated values computed for each cluster of a same metric over a plurality of historic metric anomaly time intervals.

In a further implementation form of the first, second and third aspects, analyzing the plurality of metric anomaly scores for each respective system level anomalous time interval comprises: identifying a plurality of maximum metric anomaly scores for each of the plurality of clusters of the respective system level anomalous time interval, wherein the single anomalous event score is computed according to an aggregation of the plurality of maximum metric anomaly scores of the clusters of the respective system level anomalous time interval.

In a further implementation form of the first, second, and third aspects, the system further comprises code instructions for and/or the method further comprises and/or the computer program product further comprises additional instructions for creating a filtered plurality of maximum metric anomaly scores by removing maximum metric anomaly scores below a threshold indicative of likelihood of non-anomalous event from the plurality of maximum metric anomaly scores, wherein the single anomalous event score is computed according to an aggregation of the filtered plurality of maximum metric anomaly score values.

In a further implementation form of the first, second, and third aspects, the system further comprises code instructions for and/or the method further comprises and/or the computer program product further comprises additional instructions for exponentially scaling each of the filtered plurality of maximum metric anomaly scores such that relatively higher values are boosted relatively more than relatively lower values, wherein the single anomalous event score is computed according to an aggregation of the exponentially scaled filtered plurality of maximum metric anomaly score values.

In a further implementation form of the first, second and third aspects, the plurality of processing nodes arranged as the distributed computing system are selected from the group consisting of: client terminals, applications, processes, cores of a multi-core processor, network connected network nodes, networking devices, sensors, virtual machines, hardware processors, and combinations of the aforementioned.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
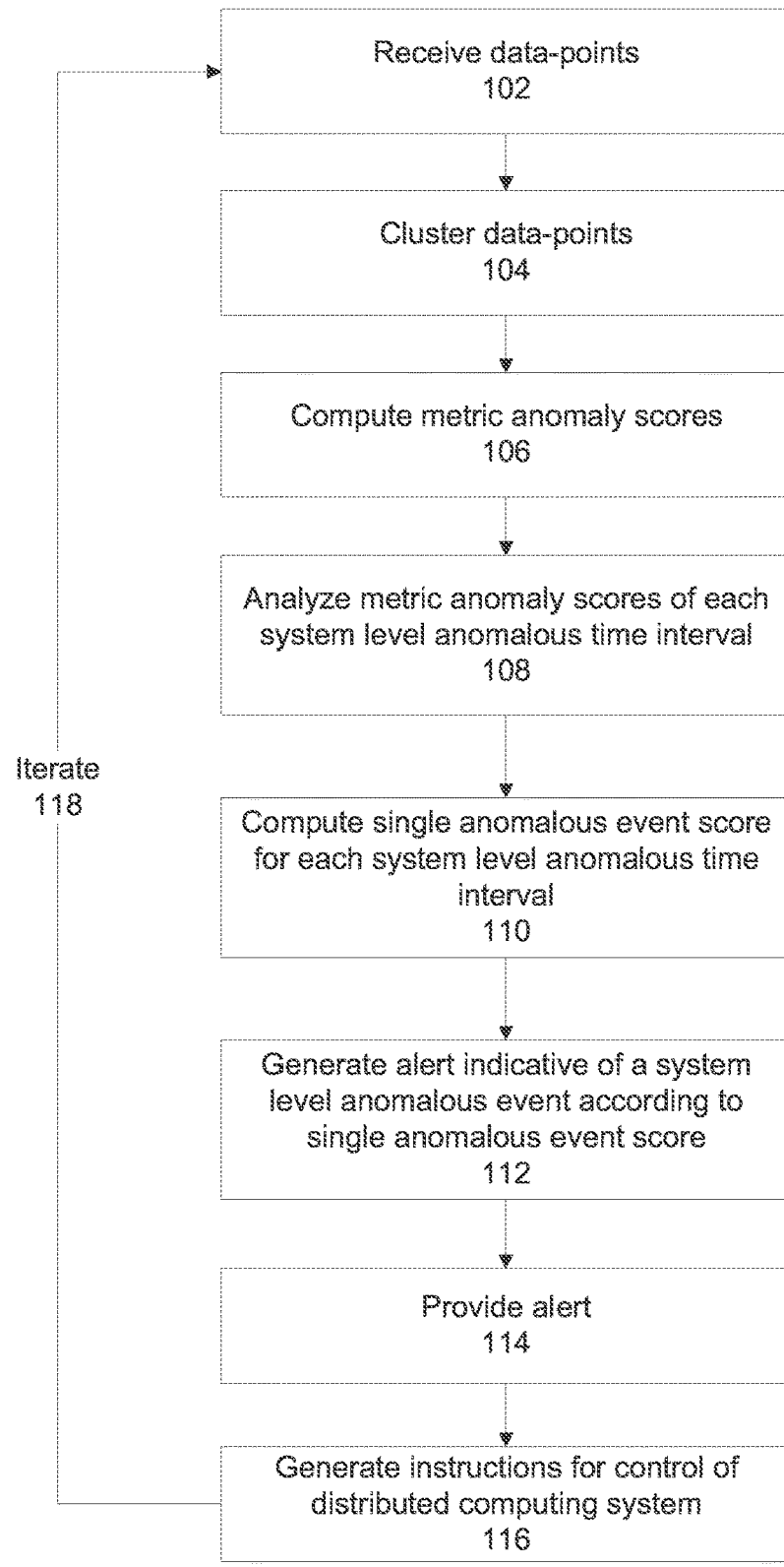
FIG. 1 is a flowchart of a process of identifying a system level anomalous event in a distributed computing system based on a single score indicative of a system level anomalous event, in accordance with some embodiments of the present invention.

The present invention, in some embodiments thereof, relates to anomaly detection and, more specifically, but not exclusively, to systems and methods for anomaly detection in a distributed computing system.

An aspect of some embodiments of the present invention relates to systems, methods, an apparatus, and/or code instructions (i.e., stored in a data storage device executable by hardware processor(s)) for computing a single anomalous event score indicative of a system level anomalous event in a distributed computing system of multiple processing nodes. Time-based data-points indicative of a time-based dynamic state of the processing node(s) of the distributed system are obtained, optionally in real-time, and/or continuously and/or by streaming of the data-points. Each of the plurality of time-based data-points is associated with a timestamp, a metric (i.e., type thereof), and a metric value. The data-points may be clustered, where each cluster stores data-points of a same type of metric and having timestamps falling with a same metric anomaly time interval. It is noted that the clustering may be an implicit step that is not directly executed in practice, but used to conceptually understand the organization of the data-points. Other features may be executed without explicitly arranging the data-points into clusters, but rather processing the data-points as if the data-points were clustered. A respective metric anomaly score, optionally a single respective metric anomaly score, is computed for each cluster. The respective metric anomaly score is indicative of likelihood of an anomalous event being represented within the respective cluster according to the metric values corresponding to each metric. The metric anomaly scores are analyzed for each system level anomalous time interval, which includes multiple metric anomaly time intervals. The single score indicative of the system level anomalous event is computed for each system level anomalous time interval according to the analysis, for example, taking the maximum metric anomaly scores for each metric anomaly time interval included in the system level anomalous time interval, and computing the average of the maximum metric anomaly scores, where the average is the single score for the respective system level anomalous time interval. The single score indicative of the system level anomalous event for the respective (e.g., current) system level anomalous time interval may be computed and/or adjusted (e.g., normalized, scaled) based on a statistical comparison with previous metric anomaly scores and/or previous single anomaly event scores of previous system level anomalous time intervals. For example, a previous predefined number of single scores of previous system level anomalous time intervals are analyzed as a time series, with the single score set according to the computed z-value of the current system level anomalous time interval. An alert indicative of the system level anomalous event is generated when the single anomalous event score computed for the respective system level anomalous time interval is according to an anomaly requirement, for example, when the value of the current single anomalous event score of the current system level anomalous time interval is statistically different over a statistical threshold from historical single anomalous event scores over a historical set of system level anomalous time intervals.

Optionally, the single anomalous event scores computed for previous system level anomalous time intervals are arranged into a time-series data structure. The alert is generated by applying a statistical detection process based on a Gaussian model to the time-series data structure, when a certain anomalous event score above a threshold of the anomaly requirement is identified.

Optionally, a pattern of the metric anomaly scores of a certain system level anomalous time intervals is identified. When a similar pattern is identified in one or more historical system level anomalous time intervals, a similarity penalty score is computed. The similarity in patterns is indicative of recurring system-wide anomalous events which are considered normal, for example, a period anti-malware scan. The single score is adjusted according to the similarity penalty score, and the alert is generated according to the adjusted score. The similarity penalty score reduces false positives, by preventing alerts from being generated according to the recurring system wide normal events.

Optionally, a start time indicative of likelihood of onset of the system level anomalous event is identified, for example, based on a timestamp associated with a nearby cluster of metric anomaly scores and/or data-points. The metric anomaly scores (and/or the data-points) which are determined as outliers in comparison to the start time are removed. The metric values of the remaining metric anomaly scores (and/or the remaining data-points) may be reduced according to a time distance from the start time indicative of likelihood of onset of the system level anomalous event. The single anomalous event score is computed according to the remaining, optionally reduced, metric anomaly scores (and/or according to the remaining data-points). The removal of outliers relative to the estimated start time further improves accuracy of detection of the anomalous event by removal of data-points less likely to be associated with the anomalous event.

Optionally, unstructured data, such as log messages are converted into numeric data-points for computation of the metric anomaly scores as described herein. The numeric data-point is computed according to a certain message template selected for each of the unstructured data items. The data-point created from the unstructured data stores one or more of: (i) a message count value computed according to a number of times the same message template is selected over a template time interval. The metric value is set according to the message count value. (ii) An identification code of the same message template selected over the template time interval. The metric is set according to the identification code. (iii) An indication of the processing node from which the respective unstructured log message originated from. (iv) An aggregation of respective numeric values of the unstructured data corresponding to parameters of the selected message templates.

At least some of the systems, methods, apparatus, and/or code instructions described herein address the technical problem of monitoring a distributed computing system of multiple computational nodes, for example, a computing cloud, a set of network connected processing nodes, and/or a multi-core processor. Monitoring such distributed computing system is a demanding task which requires a significant amount of human resources, often compared to finding a needle in a haystack. Each node of the distributed system potentially reports thousands or more of various time-based data-points in addition to massive amount of unstructured data. Anomalous events in these data sources might be related to system failures. Manual detection of significant anomalous events in such a system might be difficult due to the inability of a human to process enormous amounts of data. Failures might be missed or discovered too late, increasing MTTR (Mean-Time-To-Repair).

Setting alerts using static thresholds for a subset of the data-points may produce too many alerts, which might introduce an "alert fatigue", a state that occurs when one is exposed to many frequent alerts and consequently becomes desensitized to them. Desensitization may lead, for example, to longer response times, and/or to missing important alerts, which in turn might again increase MTTR. In addition, defining accurate static alerts thresholds and continuously tuning them is usually a time-consuming task, due to the dynamicity of the environment (e.g., trends in number of users, software changes, and the like). It is also hard to predict in advance (before the first related failure) which of the available data-points is worth defining a threshold, and what value should this threshold be configured to.

Previous other methods have been developed for univariate anomaly detection (UVAD). Such UVAD methods may be used for anomaly detection in a single metric time series without the need of defining static thresholds. However, when monitoring a typical system which consists of a large number (e.g., thousands or more) of unique metrics using such a UVAD method, an anomaly in a single metric time series might be a frequent event which occurs once every few minutes, causing alert fatigue.

Distributed systems, especially ones that include a large number of processing nodes and/or a large number of different types of metrics generated at high rates may be analyzed using multivariate anomaly detection methods that analyze multiple simultaneous time series.

At least some of the systems, methods, apparatus, and/or code instructions described herein address the technical problem of improving the accuracy of automatic detection of significant anomalous events in a distributed computing system, for example, reducing the false negatives and/or increasing the true positives.

At least some of the systems, methods, apparatus, and/or code instructions described herein provide an improvement to the field of monitoring performance of a distributed computing system. The improvement is based on computation of the single anomalous event score described herein, which is indicative of a system wide likelihood of an anomalous event taking place. The anomalous event is not necessarily isolated to one or more components of the distributed computing system, but may be significant enough to affect operation stability of the entire distributed computing system as a whole. For example, the single anomalous event score may capture anomalous behavior starting with a certain processing node, which due communication with other processing nodes, affects multiple other processing nodes. Each processing node may not necessarily exhibit significant anomalous behavior, however, taken together as a whole over the entire distributed system, the individual anomalous activities creates a synergistic anomalous event within the distributed processing system that may be significant in terms of operation stability of the distributed computing system. Such synergistic anomalous events occurring in the distributed computing system may not be detected by other approaches that independently monitor each processing node, especially when each node is only slightly affected and does not trigger an alert.

At least some of the systems, methods, apparatus, and/or code instructions described herein improve the technical field of automatic detection of system-level significant anomalies in a distributed computing system. At least some of the systems, methods, apparatus, and/or code instructions described herein improve the computational efficiency of a computing device that performs automatic detection of system-level significant anomalies in a distributed computing system in comparison to other approaches, for example, in terms of reduced utilization of computational resources (e.g., processors), reduced processing time, and/or reduced memory requirements. Exemplary improvements obtained by at least some of the systems, methods, apparatus, and/or code instructions described herein include one or more of the following:

Other approaches requires a prior knowledge of the architecture and/or dependencies between components of the monitored distributed system, which makes the initial setup very complex. In contrast, at least some of the systems, methods, apparatus, and/or code instructions described herein do not require such prior knowledge of the architecture and/or dependencies between components of the monitored distributed system, making the initial setup quick and/or easy.

Other approaches introduce a high and/or non-linear computation complexity, which might cause a situation where the required computing resources for anomaly detection of a single system data are impracticable. In contrast, at least some of the systems, methods, apparatus, and/or code instructions described herein scale with increasing number of metrics and/or provide for computational efficiency of the computing device that detects the anomalous events as described herein.

Other approaches requires a normal training set as a reference. Such normal training set is a long duration data set in which the monitored system behaves normally without any unusual incidents. Re-training by a new normal training set should be repeated periodically as the system evolves. In contrast, at least some of the systems, methods, apparatus, and/or code instructions described herein do not require designating a normal training set as a reference, do not require long duration dataset without unusual incidents, and do not require re-training.

Other approaches are not able to detect anomalous incidents in near-real-time (i.e., a short time from incident time to detection time). For example, anomaly detection processes may require batches of data taken hourly or daily. In contrast, at least some of the systems, methods, apparatus, and/or code instructions described herein provide for near-real-time detection of anomalous events.

Other approaches require that ranges (e.g., min-max) and/or distribution function of the data-points to be known in advance. In contrast, at least some of the systems, methods, apparatus, and/or code instructions described herein do not require prior knowledge of the ranges and/or the distribution function of the data-points.

Other approaches do not monitor unstructured data for anomalous events. In contrast, at least some of the systems, methods, apparatus, and/or code instructions described herein detect anomalous events according to unstructured data.

Other approaches suffer from inadequate accuracy, for example, a high number of false positives and/or low number of true positives. In contrast, at least some of the systems, methods, apparatus, and/or code instructions described herein provide high accuracy, for example, a low number of false positives and/or a high number of true positives.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms anomaly and anomalous event are interchangeable.

Figure 2:
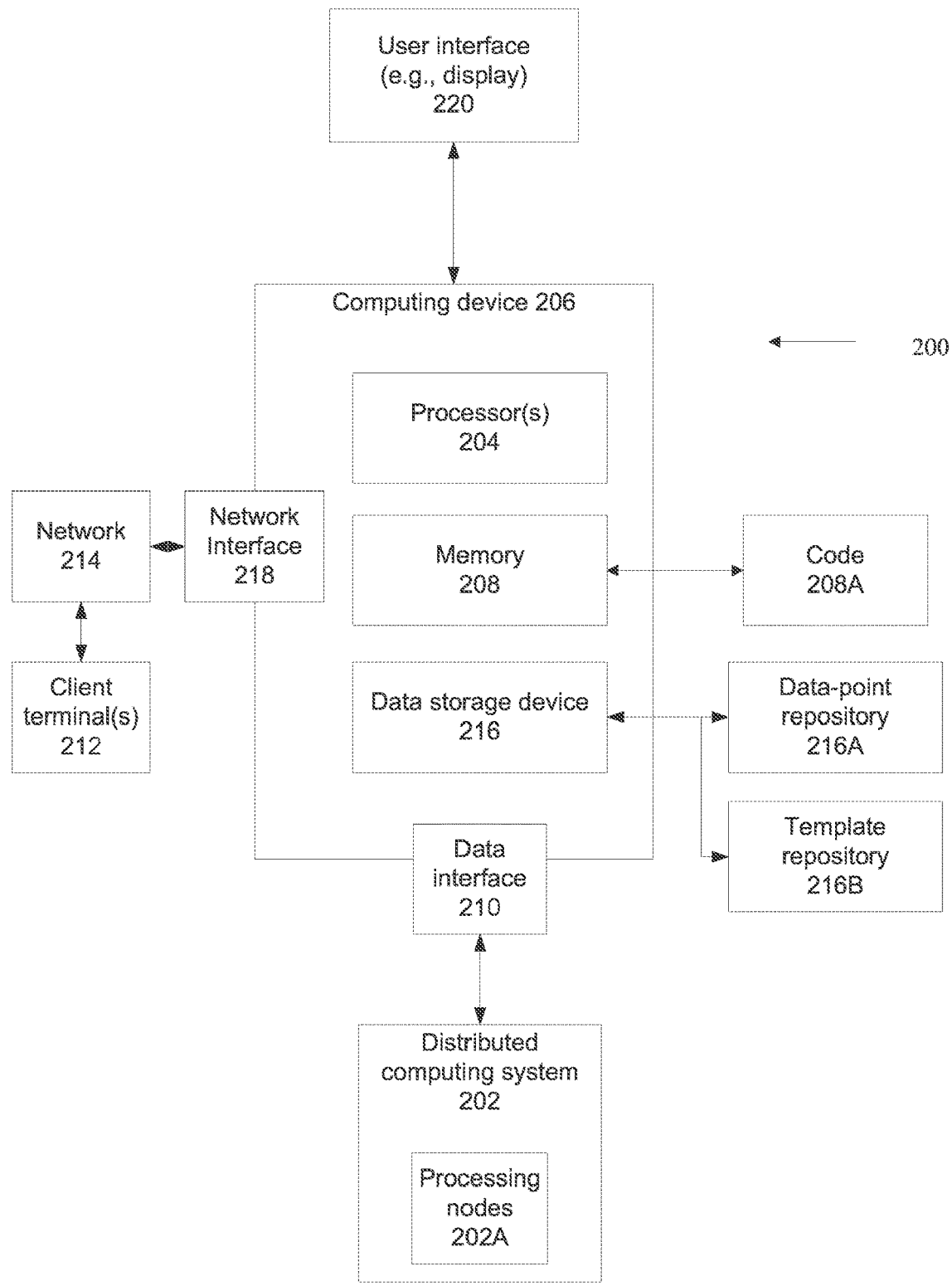
FIG. 2 is a block diagram of components of a system for identifying a system level anomalous event in a distributed computing system based on a single score indicative of a system level anomalous event, in accordance with some embodiments of the present invention.

Reference is now made to FIG. 1, which is a flowchart of a process of identifying a system level anomalous event in a distributed computing system based on a single score indicative of a system level anomalous event, in accordance with some embodiments of the present invention. Reference is also made to FIG. 2, which is a block diagram of components of a system 200 for identifying a system level anomalous event in a distributed computing system 202 based on a single score indicative of a system level anomalous event, in accordance with some embodiments of the present invention. System 200 may execute the acts of the method described with reference to FIG. 1, for example, by a hardware processor(s) 204 of a computing device 206 executing code 208A stored in a memory 208.

Distributed computing system 202 includes multiple processing nodes 202A arranged for distributed (also referred to as parallel) processing. Processing nodes 202A arranged into disturbed computing system 200 may be implemented as, for example one or more of: client terminals, applications, processes, cores of a multi-core processor, network nodes, networking hardware (e.g., router, bridge, gateway, firewall), hardware processors, sensors, and virtual machines. Distributed computing system 202 may be arranged a cloud computing platform, a single computing device, and/or a group of network connected nodes 202A. Processing nodes 202A may reside within a single device, and/or may reside on distinct devices which may be network connected. Processing nodes 202A may be physical devices and/or virtual devices. As used herein, the term processing node and component (of the distributed computing system) may sometimes be interchanged.

Computing device 206 monitors processing nodes 202A of distributed computing system 202 for computing the single score indicative of likelihood of an anomalous event, as described herein.

Different architectures of system 200 based on computing device 206 may be implemented. For example:
  Computing device 206 may be implemented on and/or as one of the processing nodes 202A of distributed computing system 202.
  Computing device 206 may be a standalone device independent from distributed computing system 202. Computing device 206 is in communication with distributed computing system 202 via a data interface 210, for example, a network interface in communication with a network connected to distributed computing system 202, a software interface in communication with distributed computing system 202 (e.g., software development kit (SDK), application programming interface (API), virtual interface, virtual private network (VPN)), and/or a dedicated interface (e.g., short range wireless interface, cable connection).
  Computing device 206 may be implemented as a server(s) (e.g., network server, web server, a computing cloud, a virtual server) that provides services of monitoring one or more distributed computing systems 202 (e.g., one or more of the acts described with reference to FIG. 1) to one or more client terminals 212 over a network 214. For example, providing software as a service (SaaS) to the client terminal(s) 212, providing software services accessible using a software interface (e.g., application programming interface (API), software development kit (SDK)), providing an application for local download to the client terminal(s) 212, providing an add-on to a web browser running on client terminal(s) 212, and/or providing functions using a remote access session to the client terminals 212, such as through a web browser executed by client terminal 212 accessing a web sited hosted by computing device 206.
  Code 208A may be designed as an add-on to existing distributed system monitoring applications, for example, as a tool-bar, library, script, and/or additional menu features. For example, a commercially available application for monitoring distributed systems may integrate code 208A to generate alerts indicative of anomalous events.

Computing device 206 may be implemented as, for example, a client terminal, a virtual machine, a server, a virtual server, a computing cloud, a mobile device, a desktop computer, a thin client, a kiosk, and a mobile device (e.g., a Smartphone, a Tablet computer, a laptop computer, a wearable computer, glasses computer, and a watch computer).

Hardware processor(s) 202 of computing device 206 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include a single processor, or multiple processors (homogenous or heterogeneous) arranged for parallel processing, as clusters and/or as one or more multi core processing devices.

Memory 208 stores code instructions executable by hardware processor(s) 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 208 stores code 208A that implements one or more features and/or acts of the method described with reference to FIG. 1 when executed by hardware processor(s) 202.

Computing device 206 may include a data storage device 216 for storing data, for example, a data-point repository 216A acting as a buffer storing the received streaming data-points, and/or a template repository 216B storing templates for converting unstructured data into numeric data-points. Data storage device 216 may be implemented as, for example, a memory, a local hard-drive, a removable storage unit, an optical disk, a storage device, and/or as a remote server and/or computing cloud (e.g., accessed using a network connection). It is noted that code instructions 208A may be stored in data repository 216, for example, with executing portions loaded into memory 208 for execution by processor(s) 204.

Computing device may include a network interface 218 for connecting with network 214. Network interface 218 and data interface 210 may be distinct components or integrated into a single component.

Data interface 212 ad/or network interface 218 may be implemented as, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 214 may be implemented as, for example, the internet, a local area network, a virtual network, a wireless network, a cellular network, a local bus, a point to point link (e.g., wired), and/or combinations of the aforementioned.

Computing unit 206 includes or is in communication with a user interface 220 that includes a mechanism designed for a user to enter data (e.g., set thresholds) and/or view presented data (e.g., alerts). Exemplary user interfaces 220 include, for example, one or more of, a touchscreen, a display, a keyboard, a mouse, gesture activated device, and voice activated software using speakers and microphone. The user interface may present a graphical user interface (GUI) for entering the data and/or viewing the displayed results.

Referring now back to FIG. 1, at 102, data-points indicative of a time-based dynamic state of the processing nodes of the distributed computing system are received by the computing device. Each of the data-points is associated with a timestamp, a (type of) metric of multiple possible (types of) metrics, and a metric value.

The data-points represent structured data, for example, defined according to a certain format. The metric values may be, for example, numeric, Boolean, selected from a set of available values, selected from a defined range of values. Optionally, in embodiments designed to process numeric values, non-numeric metric values are converted into numeric values.

The data-points are generated dynamically, in real-time or near real-time by the processing nodes and/or computing devices that monitor the processing nodes. The data-points are dynamic over time, representing a real time or near-real time state of operation of the respective processing nodes. Exemplary metrics include: CPU usage, memory usage, network utilization, and request count.

The data-points may be streamed to the computing device in real-time or near real time, as they are generated, optionally continuously. For example, transmitted over the network in packets originating from the respective processing node and/or device monitoring the processing node, with a destination address of the computing device. Alternatively or additionally, the data-points are streamed as an offline batch (i.e., retroactively) and/or are read from a file.

The number of received data-points within the same metric anomaly time interval may be, for example, over 1000, over 10000, or over 100000.

At 104, the data-points are clustered to create multiple clusters.

It is noted that the clustering feature may be an implicit step that is not directly executed in practice, with act 106 being executed according to act 104 without explicitly arranging the data-points into clusters, but rather processing the data-points as if the data-points were clustered.

Each cluster includes a respective sub-set of the data-points of the same metric, having timestamps falling within the same metric anomaly time interval.

Each metric anomaly time interval is defined according to a preset length of time, for example, 1, or 2, or 5, or 7 or 10 minutes, or other time intervals. The metric anomaly time intervals may be sequential, or may overlap one another, for example, by about 10%, or 25%, or 50%, or other overlapping percentages.

At 106, a respective metric anomaly score is computed for each respective cluster. The respective metric anomaly score is computed according to the metric values of the data-points of the same metric and within the same metric anomaly time interval.

The respective metric anomaly score denotes, for example, the likelihood of an anomalous event occurring within each cluster, i.e., an anomaly represented by the metric values of the respective metric during the respective metric anomaly time interval.

Optionally, metric values of the same type (i.e., for each cluster) are aggregated using an aggregation method, for example, selecting the maximum value of the metric values within the respective time interval, and/or computing an average of the metric values within the time interval. The metric type anomaly score for each metric may be computed according to a univariate time series anomaly detection method applied to the aggregated metric values computed over multiple metric anomaly time intervals.

The metric anomaly score may be computed according to a defined range, for example, in the range of [0,1], or [0,100], or other ranges.

The values for each cluster of each metric anomaly time interval are aggregated, for example, the average of the values of each cluster is computed. The aggregation may smooth out noisy data-points. The clusters of each metric over multiple metric anomaly time intervals may be considered as a time series. For example, clusters of values of CPU utilization over multiple metric type anomaly time intervals considered as a CPU utilization time series, and clusters of values of network bandwidth over the same multiple metric type anomaly time intervals are considered as a network bandwidth time series. A univariate time series anomaly detection method may be applied to each time series to compute the metric type anomaly score.

At 108, the metric anomaly scores of each system level anomalous time interval are analyzed.

Each system level anomalous time interval includes two or more of the metric anomaly time intervals. For example, a 30 minute long system level anomalous time interval includes six sequential metric anomaly time intervals of 5 minutes each. The analysis includes the multiple metric anomaly scores computed for the clusters of different metrics of the metric anomaly time intervals that fall within each respective system level anomalous time intervals.

Each system level anomalous time interval is defined according to a preset length of time, for example, 10, 30, 60, 120 10 minutes, or other time intervals. The system level anomalous time interval may be sequential, or may overlap one another, for example, by about 10%, or 25%, or 50%, or other overlapping percentages. The overlap of the intervals may increase detection of system level anomalous event occurring near the margins of each interval, by increasing the ability to correlate between the overlapping intervals to detect the system level anomalous event.

Optionally, the analysis of the metric anomaly scores of a certain system level anomalous time interval includes performing a statistical comparison between the metric anomaly scores of the certain system level anomalous time interval to historical metric anomaly scores of one or more historical system level anomalous time intervals. The statistical comparison evaluates a statistical difference between the current metric anomaly scores of the current system level anomalous time interval and the historical metric anomaly scores of the historical system level anomalous time intervals.

At 110, a single anomalous event score is computed for each respective system level anomalous time interval.

It is noted that the single anomalous event score may be iteratively computed for a partial time interval of the respective system level anomalous time interval, which may shorten detection time, for example, near real-time detection. For example, for a two hour long system level anomalous time interval, the single anomalous event score may be iteratively computed every 30 seconds until the full 2 hours are reached, i.e., for the first 30 second, the first 60 second, the first 90 seconds, the full 120 seconds, until the full 2 hours are reached.

The single anomalous event score is computed according to the analysis of the metric anomaly scores for the respective system level anomalous time interval. Effectively, the single anomalous event score represents an aggregation of the multiple metric anomaly scores computed for the clusters of different metrics over multiple metric anomaly time intervals falling within each respective system level anomalous time interval.

Optionally, the single score is computed by aggregating the values of the metric anomaly scores computed for each respective system level anomalous time interval, for example, selecting a maximal value of the metric anomaly scores, or calculating an average of the metric anomaly scores.

Optionally, when the analysis includes performing the statistical comparison between the current metric anomaly scores of the current system level anomalous time interval and historical metric anomaly scores of the historical system level anomalous time intervals, the single anomalous event score is indicative of a statistical distance computed according to the statistical comparison. For example, a high value of the single anomalous event score is set when the current metric anomaly scores of the current system level anomalous time interval are statistically significantly different than the historical metric anomaly scores of the historical system level anomalous time intervals. A low value of the single anomalous event score is set when the current metric anomaly scores of the current system level anomalous time interval are not statistically significantly different than the historical metric anomaly scores of the historical system level anomalous time intervals. Additional details of an exemplary implementation of computing the statistical difference according to a similarity penalty score is described below with reference to act 316 of FIG. 3. The similarity penalty score is indicative of an amount of similarity to historical single anomalous scores of historical system level anomalous time intervals. The computed single anomalous event score is adjusted according to the similarity penalty score.

At 112, an alert indicative of the system level anomalous event is generated for a certain system level anomalous time interval, when the single anomalous event score is according to an anomaly requirement. The anomaly requirement may be, for example, a threshold value. Single anomalous event scores having values above the threshold trigger the alert.

Optionally, the single anomalous event scores computed for multiple system level anomalous time intervals (i.e., one anomalous event score per system level anomalous time interval) are arranged into a time-series data structure. The time series data structure may be analyzed by applying a statistical detection process based on a Gaussian model to identify anomalous event score(s) above a threshold denoting the anomaly requirement. The alert is generated for the identified anomalous event scores above the threshold. The statistical analysis may reduce the amount of false positives, by limiting the number of alerts that may be generated according to the Gaussian model. For example, generating alerts only when a certain single anomalous event score having a value three standard deviations from the mean is identified, which statistically limits the number of alerts to 0.3%.

Optionally, the anomaly requirement is set as a threshold of the statistical distance computed based on the statistical comparison between the current metric anomaly scores of the current system level anomalous time interval and historical metric anomaly scores of the historical system level anomalous time intervals.

At 114, the alert is provided, for example, presented on a display of a client terminal, stored in a data storage device (e.g., in a log), and/or forwarded to another process for further processing. The other process may reside on the computing device within the distributed system, and/or on a remote server (in which case the forwarding may be over the network).

At 116, instructions for control of the distributed computing system are automatically generated in response to the generated alert. The instructions may be for controlling the distributed computing system for mitigating effects of the system level anomalous event on operation of the distributed computing system. The mitigating effects may enable continued operation of the distributed computing system, optionally in a reduced state, and optionally preventing a crash of the distributed computing system or components thereof. Defects due to the detected anomalous event. Exemplary instructions include:

Entering a "safe mode" by the distributed system in which basic functionality is maintained, to prevent a crash of the distributed system. It is noted that the "safe mode" may be set for certain component(s) of the distributed processing system, for example, processing node(s), applications, processes, or other components.

Placing components of the distributed computing system in a quarantine, for example, in a sandbox, and/or isolating the component(s) by preventing data communication with other non-isolated components.

Executing an anti-malware application on one or more components of the distributed computing system.

The instructions may include, for example, code instructions, binary instructions, text based script, values of parameters of a template.

The instructions may include instructions for execution by the distributed computing system, by another server in communication with the distributed computing system, by processing nodes(s) from where the data-points associated with the triggering of the alert originated, and/or other processing nodes of the distributed computing system.

The instructions may be automatically executed by one or more hardware processors of the computing device, the processing node(s) associated with the alert, other processing nodes, and/or another server which may be remotely located. Alternatively or additionally, the instructions may be presented on a display for manual execution by a user.

At 118, one or more of acts 102-116 are iterated. The iteration is performed as additional data-points are received, optionally in real-time. The iterations provide for real-time or near real-time monitoring of the distributed computing system, for generating alerts indicative of likelihood of an anomalous event in real-time or near real-time.

Figure 3:
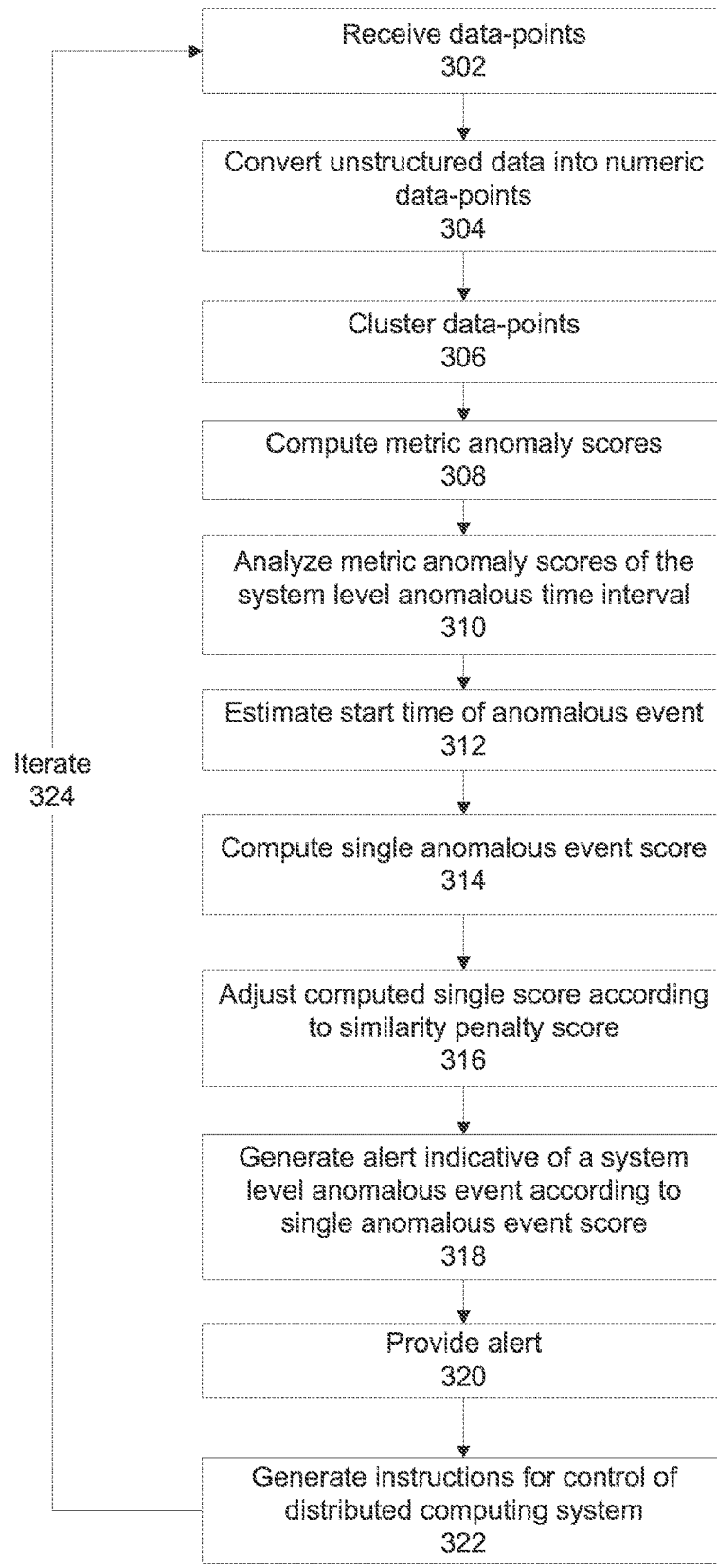
FIG. 3 is a flowchart that includes additional optional features of the process described with reference to FIG. 1, in accordance with some embodiments of the present invention.

Reference is now made to FIG. 3, which is a flowchart that includes additional optional features of the process described with reference to FIG. 1, in accordance with some embodiments of the present invention. One or more features of the process described with reference to FIG. 3 may be implemented by components of system 200 described with reference to FIG. 2, for example, by hardware processor(s) 204 of computing device 206 executing code 208A stored in memory 208.

At 302, data-points are received, as described with reference to act 102 of FIG. 1. Optionally, the received data-points include unstructured data, for example, log messages. Log messages may include information that may be used to understand the activity of the system and to diagnose problems. Log messages may be created as human readable text.

Log messages may not be expressed as structured data-point in typical distributed systems. For example, log messages may be triggered in response to new types of metrics and/or monitoring rules that are added after a certain failure had occurred, in order to detect another similar failure in the future.

Exemplary unstructured data includes operation system logs and application logs of the various processing nodes.

As used herein, the term unstructured log messages is sometimes interchangeable with the term unstructured data of the received data-points.

At 304, the unstructured log messages are converted into numeric data-points. The conversion into numeric data-points is performed to enable clustering and computation of the metric anomaly scores as described herein.

In an exemplary implementation, the numeric data-point created from conversion of the unstructured log messages stores one or more of:

(i) A message count value. The message count value may be computed according to a number of times a same respective message template is selected from multiple available messages templates over a template time interval. A message template is selected for each of the unstructured log messages. The metric value of the data-point is set according to the message count value.

The template time interval may be a predefined time value, for example, about 30 seconds, or 1 minute, or 2 minutes, or other values. The template time interval may be set to be significantly shorter than the metric anomaly time interval.

(ii) An identification code (ID) of the template. Each message template is assigned a unique ID. The ID is indicative of the same respective message template selected over the template time interval. The metric is set according to the ID.

(iii) An indication of a the processing node from which the respective unstructured log message originated from, for example, the network address stored in the originating field of the packet that delivered the unstructured log message, an ID of the processing node as defined by the distributing system, or other ID methods. The indication may include a combination of IDs of one or more of: the host computer from which the log message originated from, an ID of the application associated with the log message, and an ID of an instance of a process associated with the log message.

Optionally both the template ID and the ID of the processing node are used as the metric of the data-point.

(iv) An aggregation of respective numeric values of the unstructured log messages corresponding to parameters of the selected message templates.

The templates, from which specific templates are selected for each unstructured log message, are computed according to clusters of the unstructured log messages. The clusters may be computed based on machine learning clustering processes.

The process of selecting the most relevant template for the log message is sometimes referred to herein as de-templating.

Numeric values found in log templates may be used as metrics values. For each such unique value (e.g. the first parameter of a specific template ID), the average value of all instances of the template ID in the time-interval is calculated and used as a data point value.

For example, for the following exemplary raw log message:
    2017-11-29 14:08:00.713 Handling 5,000 records, offsets [P0/206,339-P0/211,338], Queue length 401
    2017-11-29 14:08:00.781 Indexing 5,000/5,000 data points
    2017-11-29 14:08:00.782 Performing bulk index of 5000 items, 2,837,813 bytes in 57 batches, min-payload-size=551b, max-payload-size=574b
    2017-11-29 14:08:01.050 Indexing completed
    2017-11-29 14:08:01.050 Handling 401 records, offsets [P0/211,339-P0/211,739], Queue length 0
    2017-11-29 14:08:01.056 Indexing 401/401 data points
    2017-11-29 14:08:01.056 Performing bulk index of 401 items, 228,001 bytes in 5 batches, min-payload-size=557b, max-payload-size=574b
    2017-11-29 14:08:01.078 Indexing completed
    2017-11-29 14:08:04.081 No data available
    2017-11-29 14:08:07.084 No data available
    2017-11-29 14:08:10.082 No data available May be de-templated to:
    Template ID|Template
    t1|Handling {p1} records, offsets [{p2}/{p3}-{p4}/{p5}], Queue length {p6}
    t2|Indexing {p7}/{p8} data points
    t3|Performing bulk index of {p9} items, {p10} bytes in {p11} batches, min-payload-size={p12}b, max-payload-size={p13}b
    t4|Indexing completed
    t5|No data available Then, the following data-points are produced for the interval [2017-11-29 14:08:30+−30 sec]:

Timestamp, Metric Name, Value
2017-11-29 14:08:30, newspaper.host1.persistanceService.t1.Count, 2
2017-11-29 14:08:30, newspaper.host1.persistanceService.t2.Count, 2
2017-11-29 14:08:30, newspaper.host1.persistanceService.t3.Count, 2
2017-11-29 14:08:30, newspaper.host1.persistanceService.t4.Count, 2
2017-11-29 14:08:30, newspaper.host1.persistanceService.t5.Count, 3
2017-11-29 14:08:30, newspaper.host1.persistanceService.t1.p1, 2700.5
2017-11-29 14:08:30, newspaper.host1.persistanceService.t1.p3, 208839
2017-11-29 14:08:30, newspaper.host1.persistanceService.t1.p5, 211538.5
2017-11-29 14:08:30, newspaper.host1.persistanceService.t1.p6, 200.5
2017-11-29 14:08:30, newspaper.host1.persistanceService.t2.p7, 2700.5
2017-11-29 14:08:30, newspaper.host1.persistanceService.t2.p8, 2700.5

At 306, the data-points are clustered, as described with reference to act 104 of FIG. 1.

At 308, the metric anomaly scores are computed, as described with reference to act 106 of FIG. 1.

At 310, the metric anomaly scores of each (e.g., the current) system level anomalous time interval are analyzed, for example, as described with reference to act 108 of FIG. 1.

An exemplary process of analyzing the metric anomaly scores is now described for the system level anomalous time interval mathematically denoted as [startTime,startTime+d]:

Identify the maximum metric anomaly scores for each of the clusters of the respective system level anomalous time interval. The process may be mathematically denoted as:

MaxAnom_i←Metric_(t,i).maxBy(anomalyScore):startTime≤t≤startTime+d

The single anomalous event score may be computed according to an aggregation of the maximal metric anomaly scores, for example, as an average thereof.

Filtering the maximum metric anomaly scores by removing maximum metric anomaly scores below a threshold. The threshold is selected to differentiate between score likely to be associated with an anomalous event and score likely to be associated with a non-anomalous event. The removed scores denote an association with non-anomalous events. The filtering may reduce the noise of the non-anomalous events and/or non-anomalous data-points. The process may be mathematically denoted as:

AnomMetric←MaxAnom.filter{it.anomalyScore≥th}

The single anomalous event score may be computed according to an aggregation of the filtered maximal metric anomaly scores, for example, as an average thereof.

Scale the metric anomaly scores (optionally the ones remaining after the filtering), using a non-linear scale optionally an exponential scale, so that relatively higher metric anomaly scores are boosted relatively more than relatively lower metric anomaly scores. The process may be mathematically denoted as:

AnomMetric_(i).scaledScore←$\sqrt[96]{}$·AnomMetric_i.score$^5$

The boosting assigns relatively higher weights to the relatively higher metric anomaly scores during computation of the single anomalous event score based on aggregation, for example, an average.

The boosting may improve detection of anomalous events which massively effect relatively few data-points. For example, consider a case where a rare type of error message is detected in the log. The count metric for this message type gets a very-high metric anomaly score, but the single anomalous event score computed for the system level anomalous time interval might not get affected that much, especially if the system reports a high number of data-points. Applying a power based formula to metric anomaly scores increases the influence of a single anomaly in a non-linear fashion.

At 312, an estimated start time indicative of likelihood of onset of the anomalous event may be identified within one or more system level anomalous time intervals. The sub-set of the metric anomaly scores determined as outliers according to the start time is removed, to compute a remaining set of the metric anomaly scores. The single anomalous event score may be computed according to the remaining set of metric anomaly score.

It is noted that act 312 may be considered as an option of the analysis step described with reference to act 108 of FIG. 1.

The start time may be identified, for example, by a process that evaluates the different timestamps of the different metric anomaly scores of the clusters. The timestamp associated with the largest number of metric anomaly scores having the highest values is selected as being most likely indicative of start of the anomalous event.

Each candidate incident start time may be mathematical represented as:

cit∈AnomMetric_(t,i).timestamp.

Metric anomaly scores located a distance away from the start time according to a statistical distance requirement are removed from further processing. For example, metric anomaly scores located prior to the start time, and/or metric anomaly scores location more than a time threshold away from the start time, for example, 1 minute, 5 minutes, or 10 minutes.

The set of remaining metric anomaly scores remaining after the filtering of metric anomaly scores prior to the start time may be mathematically represented as:

CandidateMetric_cit←AnomMetric_t.filter{it.timestamp≥cit}

The remaining metric anomaly scores may be adjusted according to the time distance away from the initial start. For example, metric anomaly scores having a relatively longer time distance from the start time are reduced by a relatively greater amount than metric anomaly scores having a relatively shorter time distance from the start time. The reduction of the value may be mathematically represented as:

CandidateMetric_(cit,i).scaledScore←(CandidateMetric_(cit,i).scaledScore)/$\sqrt[4]{}$CandidateMetric_(cit,i).timestamp-cit+1)

Optionally, scaled metric anomaly scores below a scale threshold are filtered out. The filtered out scaled metric anomaly scores are considered as not related to the anomalous event when the distance from the initial start time is larger than a time threshold. The filtering out may be mathematically represented as:

CandidateMetric_cit←CandidateMetric_cit.filter {it.scaledScore>3.0}

At 314, the single anomalous event score may be computed according to the remaining set of the metric anomaly scores of act 312, and/or as described with reference to act 110 of FIG. 1

The single anomalous event score may be computed by aggregating the remaining set of the metric anomaly scores of the respective system level anomalous time interval, for example, computing the average value of the remaining set of the metric anomaly scores.

The computation of the single anomalous event score may be performed according to the following exemplary mathematical equations and exemplary process. The described exemplary process may reduce noise from unrelated datapoints that lead to high metric anomaly scores which occur during the system level anomalous time interval. The described process may improve act 316:

Candidate_cit.iras←

$(\Sigma\_(i=1)\char`\^n$ CandidateMetric_(cit,i).scaledScore)/(size(Metric_t))

Where the count of metrics used for calculating the average is the total number of metrics in the interval (before filtering out non-anomalous metrics).

The cit for which iras_(t,cit) is maximal is selected.

The candidate incident time (as described with reference to act 312) resulting in the maximal single anomalous event score is assumed to be the actual incident time.

incidentTime←Candidate.maxBy{iras}.cit iras←Candidate.maxBy{iras}.iras

At 316, the computed single anomalous event score of a certain system level anomalous time interval may be adjusted according to a similarity penalty score indicative of an amount of similarity to historical single anomalous scores of historical system level anomalous time intervals.

Optionally, a pattern of the metric anomaly scores of the certain system level anomalous time interval is identified. The pattern may be compared to historical patterns of historical metric anomaly scores of historical system level anomalous time intervals. The similarity penalty score is computed according to the similarity between the patterns, optionally according to a similarity requirement. For example, a high similarity penalty score is computed for a high level of similarity.

The similarity between patterns may be computed, for example, by computing a correlation value between the patterns.

The patterns may be computed for historical system level anomalous time intervals having single anomalous event scores above a pattern threshold value.

The historical system level anomalous time intervals may be defined according to a historical time limit, for example, the past 1 day, 7 days, 1 month, or other values.

The computed single anomalous event score is adjusted according to the similarity penalty score. The similarity penalty score may be computed as a value within a range, for example, [0,1], where one end of the range denotes completely different patterns and the other end of the range denotes exact similar patterns. For example, the greater the similarity of the pattern to historical patterns, the greater the amount by which the single anomalous event score is reduced by the similarity penalty score. Therefore, repeatedly occurring major events, for example occasional anti-malware scans and/or security drills, are removed from being considered as being anomalous events.

In terms of mathematical representation, the iras are penalized according to similarity to past intervals. Computation of similarity penalty of the current interval may be denoted as:

HourDistance_i←Hours(curInterval.startTime)−Hours(PastInterval_i.startTime)

HourDistExp_i← HourDistance_i ^(-timeDistance-FadingFactor)

SimilarityDistance_(i)←simDiff(curInterval,PastInterval_i)

PenvaltyFactor_i← SimilarityDistance_(i) ^(HourDistExp_i)

TopDownPenalties=sorted(PenaltyFactor)

iras←iras·$\Pi\_(j=1)\char`\^$MaxPenalties TopDownPenalties_j simDiff(interval_A,interval_b):

AllAnoms←interval_A.AnomMetric ∪ interval_B.AnomMetric

CommonAnoms←interval_A.AnomMetric ∩ interval_B.AnomMetric simRatio←$(\Sigma\_j$ 2·min (CommonAnoms_j.scaledScore_A,CommonAnoms_j .scaledScore_B) /($\Sigma\_i$ AllAnoms_i.scaledScore_A+AllAnoms_i.scaledScore_B))

diff←1−simRatio where: iras is multiplied by the difference score of the top N similar intervals. The penalty from each past interval is influenced also by its time distance from the current interval.

At 318, the alert may be generated according to the adjusted single anomalous event score. The alert may be generated for example, as described with reference to act 112 of FIG. 1.

An exemplary statistical process of generating the alert is now described. A statistical score, for example, the Z-Score, of the current interval is computed using the computed single anomalous event scores of the system level anomalous time intervals as data-points. Z-Score is used to check for outliers when a population distribution is normal (e.g., Gaussian). For a time-series, the Z-score is measured as the distance of the last input value from the accumulated average so far, divided by the accumulated standard deviation so far.

Z-score is mathematically denoted as: $z=(x-\mu)/\sigma$

The set of the single anomalous event scores of previous (i.e., historical) system level anomalous time interval is considered as a time series. The outcome z-value of the current system level anomalous time interval is considered as the single anomalous event score of the current interval.

Each system level anomalous time interval with a z-score above the alert requirement threshold (e.g., 3.0 standard deviations) is considered anomalous. Assuming that the distribution of system level anomalous time intervals in a typical distributed system is modeled using a Gaussian Model, only 0.26% of intervals (1 of each 385 instances) will be considered as anomalous. Using z-score normalize the iras time-series so that intervals abnormality of any distributed system with a general scale may be measured.

At 320, the alert is provided, for example, as described with reference to act 114 of FIG. 1.

At 322, instructions for mitigating effects of the system level anomalous event are generated, for example, as described with reference to act 116 of FIG. 1.

At 324, one or more of acts 302-322 are iterated, for example, as described with reference to act 118 of FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant data-points and processing nodes will be developed and the scope of the terms data-points and processing nodes are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for identifying a system level anomalous event in a distributed computing system comprising a plurality of processing nodes, the system comprising:
   a non-transitory memory having stored thereon a code for execution by at least one hardware processor, the code comprising code for:
      receiving a plurality of data-points indicative of a time-based dynamic state of the plurality of processing nodes of the distributed computing system, wherein each of the plurality of data-points is associated with a timestamp a metric of a plurality of metrics, and a metric value;
      clustering the plurality of data-points into a plurality of clusters, wherein each cluster comprises a respective sub-set of the plurality of data-points having a same metric of the plurality of metrics and a timestamp within a same metric anomaly time interval of a plurality of metric anomaly time intervals;
      computing a plurality of metric anomaly scores, wherein each respective metric anomaly score is computed for each respective cluster of the plurality of clusters, and denotes likelihood of an anomaly being present within the respective cluster;
      analyzing the plurality of metric anomaly scores of each system level anomalous time interval of a plurality of system level anomalous time intervals, wherein each system level anomalous time interval includes at least two of the plurality of metric anomaly time intervals;
      computing a single anomalous event score for each respective system level anomalous time interval according to the analysis of the plurality of metric anomaly scores for the respective system level anomalous time interval; and
      generating an alert indicative of the system level anomalous event for a certain system level anomalous time interval when the single anomalous event score is according to an anomaly requirement;
   wherein the code further comprising code for:
      identifying a pattern of the plurality of metric anomaly scores of a certain system level anomalous time interval;
      computing a similarity penalty score when the identified pattern is similar according to a similarity requirement to at least one historical pattern of a historical plurality of metric anomaly scores of at least one historical system level anomalous time interval; and computing an adjusted single anomalous event score by adjusting the single anomalous event score according to the similarity penalty score;

wherein the alert is generated according to the adjusted single anomalous event score.

2. The system of claim 1, further comprising code for generating code instructions for controlling the distributed computing system for mitigating effects of the system level anomalous event on operation of the distributed computing system.

3. The system of claim 1, wherein the plurality of data-points comprise a plurality of unstructured log messages; and further comprising code for converting the unstructured log messages into at least one of the plurality of data-points, wherein each of the converted at least one of the plurality of data-points stores:

(i) a message count value computed according to a number of time a same respective message template is selected from a plurality of messages templates over a template time interval, wherein a message template is selected for each of the plurality of unstructured log messages, wherein the metric value is set according to the message count value, (ii) an identification code indicative of the same respective message template selection over the template time interval, wherein the metric is set according to the identification code.

4. The system of claim 3, wherein the plurality of templates are computed according to corresponding clusters created from the plurality of unstructured log messages.

5. The system of claim 3, wherein each of the converted at least one of the plurality of data-points further stores at least one of: (iii) an indication of a certain processing node of the plurality of processing nodes from which the respective unstructured log message originated from, and (iv) an aggregation of respective numeric values of the unstructured log messages corresponding to parameters of the selected message templates.

6. A system for identifying a system level anomalous event in a distributed computing system comprising a plurality of processing nodes, the system comprising:

a non-transitory memory having stored thereon a code for execution by at least one hardware processor, the code comprising code for:

receiving a plurality of data-points indicative of a time-based dynamic state of the plurality of processing nodes of the distributed computing system, wherein each of the plurality of data-points is associated with a timestamp, a metric of a plurality of metrics, and a metric value;

clustering the plurality of data-points into a plurality of clusters, wherein each cluster comprises a respective sub-set of the plurality of data-points having a same metric of the plurality of metrics and a timestamp within a same metric anomaly time interval of a plurality of metric anomaly time intervals;

computing a plurality of metric anomaly scores, wherein each respective metric anomaly score is computed for each respective cluster of the plurality of cluster, and denotes likelihood of an anomaly being present within the respective cluster;

analyzing the plurality of metric anomaly scores of each system level anomalous time interval of a plurality of system level anomalous time intervals, wherein each system level anomalous time interval includes at least two of the plurality of metric anomaly time intervals;

computing a single anomalous event score for each respective system level anomalous time interval according to the analysis of the plurality of metric anomaly scores for the respective system level anomalous time interval; and generating an alert indicative of the system level anomalous event for a certain system level anomalous time interval when the single anomalous event score is according to an anomaly requirement;

wherein analyzing the plurality of metric anomaly scores for each respective system level anomalous time interval comprises:

identifying a plurality of maximum metric anomaly scores for each of the plurality of clusters of the respective system level anomalous time interval, wherein the single anomalous event score is computed according to an aggregation of the plurality of maximum metric anomaly scores of the clusters of the respective system level anomalous time interval.

7. The system of claim 6, wherein the analyzing comprising:

identifying, within at least one system level anomalous time intervals, a start time indicative of likelihood of onset of the system level anomalous event;

removing a sub-set of the plurality of metric anomaly scores determined as outliers according to the start time to compute a remaining set of the plurality of metric anomaly scores;

wherein the single anomalous event score is computed according to the remaining set of the plurality of metric anomaly scores.

8. The system of claim 7, wherein the start time is computed according to a timestamp associated with a largest number of a set of the plurality of metric anomaly scores having highest values within a certain system level anomalous time interval, and wherein the outliers are computed according to metric anomaly scores located a distance away from the start time determined according to a statistical distance requirement.

9. The system of claim 7, further comprising code for adjusting the remaining set of the plurality of metric anomaly scores according to a time distance from the start time, wherein metric anomaly scores having a relatively longer time distance from the start time are reduced relatively greater than metric anomaly scores having a relatively shorter time distance from the start time.

10. The system of claim 6, wherein the single anomalous event score is computed by aggregating the plurality of metric anomaly scores.

11. The system of claim 6, wherein the analysis comprises performing a statistical comparison between certain metric anomaly scores of a certain system level anomalous time interval and a plurality of historical metric anomaly scores of a plurality of historical system level anomalous time interval, wherein the single anomalous event score is indicative of a statistical distance computed according to the statistical comparison, wherein the anomaly requirement denotes a threshold of the statistical distance.

12. The system of claim 6, wherein the plurality of data-points are streamed in real time.

13. The system of claim 6, wherein the respective metric anomaly score computed according to data-points of each metric of the plurality of metrics is computed according to a univariate time series anomaly detection method applied to a time series created from aggregated values computed for each cluster of a same metric over a plurality of historic metric anomaly time intervals.

14. The system of claim 6, further comprising code for creating a filtered plurality of maximum metric anomaly scores by removing maximum metric anomaly scores below a threshold indicative of likelihood of non-anomalous event from the plurality of maximum metric anomaly scores, wherein the single anomalous event score is computed according to an aggregation of the filtered plurality of maximum metric anomaly score values.

15. The system of claim 14, further comprising code for exponentially scaling each of the filtered plurality of maximum metric anomaly scores such that relatively higher values are boosted relatively more than relatively lower values, wherein the single anomalous event score is computed according to an aggregation of the exponentially scaled filtered plurality of maximum metric anomaly score values.

16. The system of claim 6, wherein the plurality of processing nodes arranged as the distributed computing system are selected from the group consisting of: client terminals, applications, processes, cores of a multi-core processor, network connected network nodes, networking devices, sensors, virtual machines, hardware processors, and combinations of the aforementioned.

17. A method of identifying a system level anomalous event in a distributed computing system comprising a plurality of processing nodes, comprising:

receiving a plurality of data-points indicative of a time-based dynamic state of the plurality of processing nodes of the distributed computing system, wherein each of the plurality of data-points is associated with a timestamp, a metric of a plurality of metrics, and a metric value;

clustering the plurality of data-points into a plurality of clusters, wherein each cluster comprises a respective sub-set of the plurality of data-points having a same metric of the plurality of metrics and a timestamp within a same metric anomaly time interval of a plurality of metric anomaly time intervals;

computing a plurality of metric anomaly scores, wherein each respective metric anomaly score is computed for each respective cluster of the plurality of clusters, and denotes likelihood of an anomaly being present within the respective cluster;

analyzing the plurality of metric anomaly scores of each system level anomalous time interval of a plurality of system level anomalous time intervals, wherein each system level anomalous time interval includes at least two of the plurality of metric anomaly time intervals;

computing a single anomalous event score for each respective system level anomalous time interval according to the analysis of the plurality of metric anomaly scores for the respective system level anomalous time interval; and generating an alert indicative of the system level anomalous event for a certain system level anomalous time interval when the single anomalous event score is according to an anomaly requirement;

wherein analyzing the plurality of metric anomaly scores for each respective system level anomalous time interval comprises:

identifying a plurality of maximum metric anomaly scores for each of the plurality of clusters of the respective system level anomalous time interval, wherein the single anomalous event score is computed according to an aggregation of the plurality of maximum metric anomaly scores of the clusters of the respective system level anomalous time interval.

* * * * *